United States Patent [19]

Stiller et al.

[11] Patent Number: 5,419,572
[45] Date of Patent: May 30, 1995

[54] RECIPROCATING BICYCLE DRIVE

[76] Inventors: Alfred H. Stiller, 443 Jefferson St., Morgantown, W. Va. 26505; David R. Walton, 1905 42nd St., Parkersburg, W. Va. 26104

[21] Appl. No.: 187,897

[22] Filed: Jan. 28, 1994

[51] Int. Cl.⁶ ............................................. B62M 1/04
[52] U.S. Cl. ................................. 280/252; 280/260; 74/594.2
[58] Field of Search ............... 280/252, 260, 261, 259; 74/594.1, 594.2, 594.3

[56] References Cited

U.S. PATENT DOCUMENTS

| | | | |
|---|---|---|---|
| 3,759,543 | 9/1973 | Clark | 280/236 |
| 3,779,099 | 12/1973 | Trammell, Jr. | 280/256 |
| 3,820,820 | 6/1974 | Kutz | 280/252 |
| 4,019,230 | 4/1977 | Pollard | 280/214 |
| 4,169,609 | 10/1979 | Zampedro | 280/241 |
| 4,173,154 | 11/1979 | Sawmiller et al. | 280/252 |
| 4,227,712 | 10/1980 | Dick | 280/236 |
| 4,561,668 | 12/1985 | Klopfenstein | 280/226.1 |
| 4,564,206 | 1/1986 | Lenhardt | 280/252 |
| 5,156,412 | 10/1992 | Meguerditchian | 280/252 |
| 5,236,211 | 8/1993 | Meguerditchian | 280/252 |
| 5,261,294 | 11/1993 | Ticer et al. | 280/260 |

FOREIGN PATENT DOCUMENTS

| | | | |
|---|---|---|---|
| 849645 | 11/1939 | France | 280/260 |
| 670848 | 1/1939 | Germany | 280/252 |
| 671 | of 1881 | United Kingdom | 280/260 |

*Primary Examiner*—Karin L. Tyson
*Assistant Examiner*—Kevin Hurley
*Attorney, Agent, or Firm*—John VandenBosche

[57] ABSTRACT

A bicycle drive mechanism which converts linear or elliptical reciprocating motion of the bicycle's pedals to rotary motion of the spindle and the wheels. The mechanism uses a simplified Cardan gear arrangement. There are two arms which rotate in opposite directions to each other. One of the arms is attached to the spindle and the other arm is rotatably connected to the first arm. The pedal is on the opposite end of the second arm from the first arm. The rotation of the two arms relative to each other is achieved through a planetary gear system. Thus the pedals define a linear or elliptical reciprocating path depending on the length of the second arm while imparting rotary motion to the spindle.

32 Claims, 4 Drawing Sheets

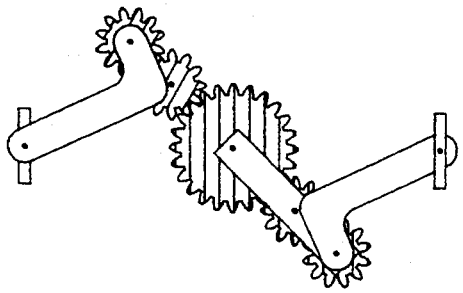
FIG 4
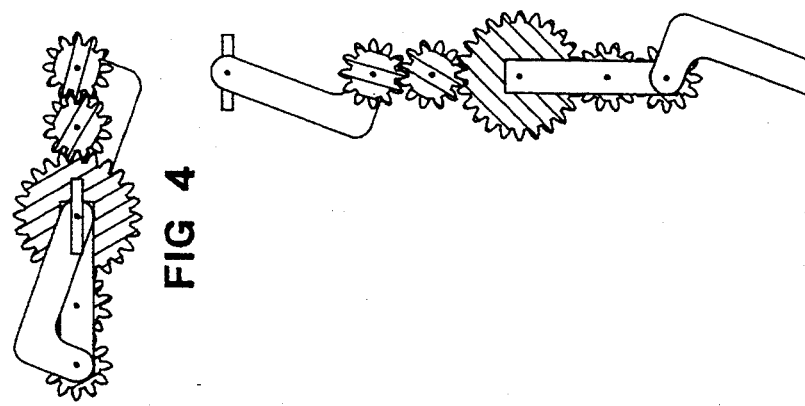
FIG 5
FIG 6
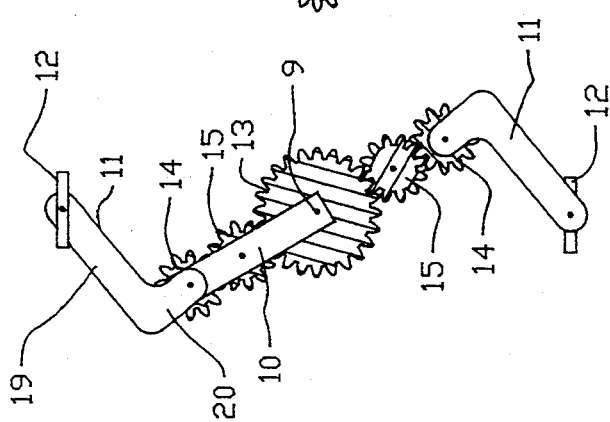
FIG 3
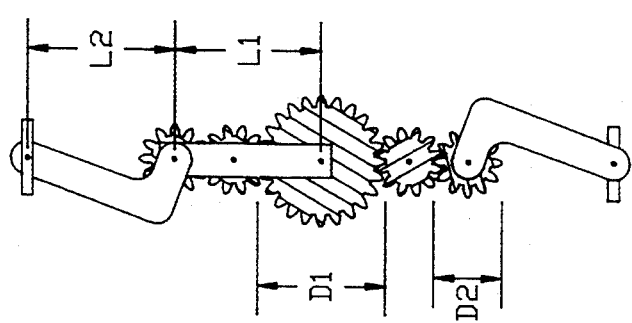
FIG 2

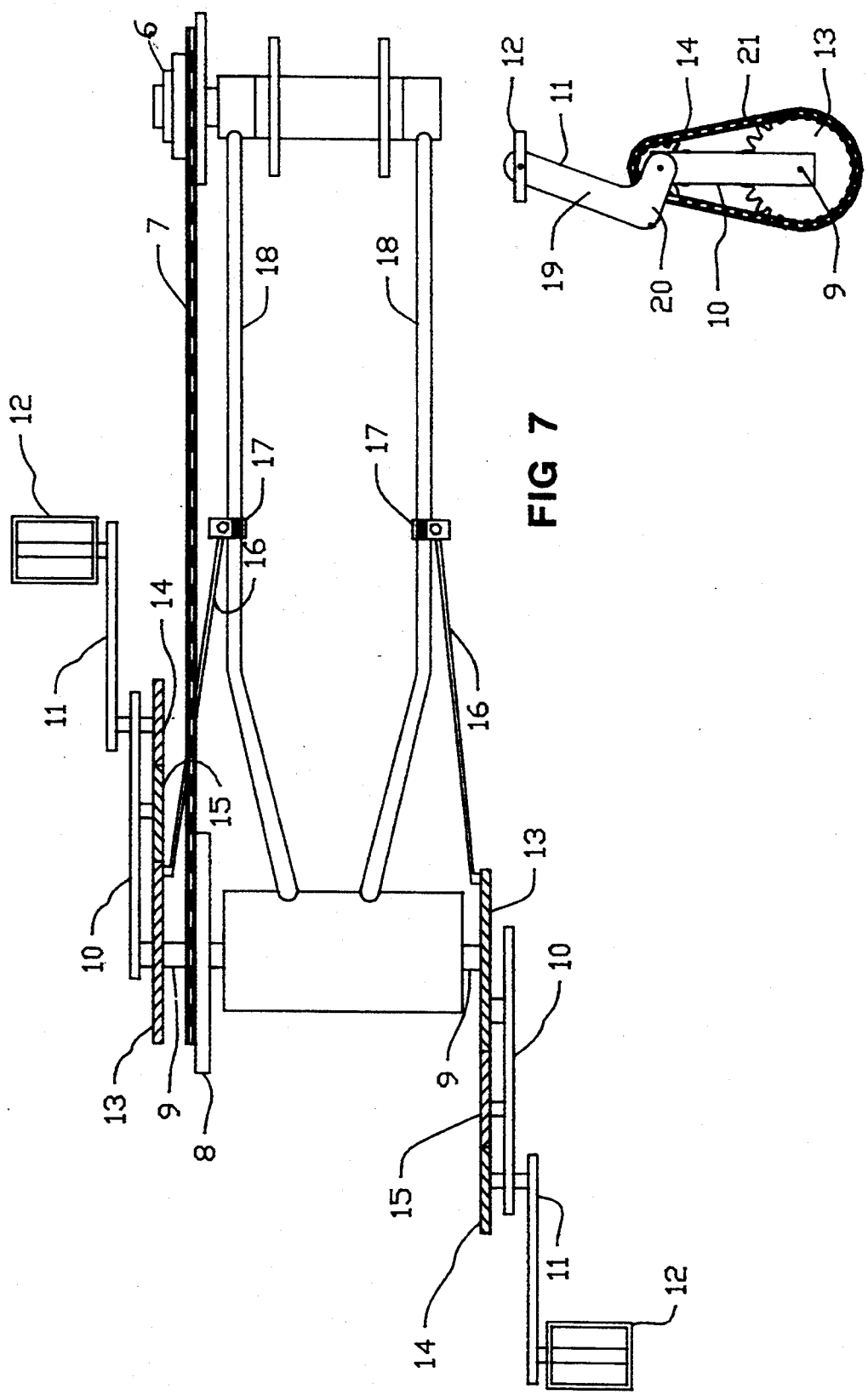

RECIPROCATING BICYCLE DRIVE

FIELD OF THE INVENTION

This invention pertains to the field of bicycle pedal drives. More specifically, it pertains to a new mechanism which allows for propulsion of a bicycle through linear or elliptical reciprocating movement of the bicycle's pedals.

BACKGROUND OF THE INVENTION

The bicycle is perhaps the most widely known form of transportation in the world today. It is used for transportation, recreation, fitness, and business in nearly every part of the world. In the U.S., the total industry volume (bikes, parts, and accessories) in 1972 was estimated at $700 million annually. The bicycle institute of America estimated that in 1972, there were around 85 million bicycle users in the U.S. and that bicycles outsold automobiles, 13 million to 11 million. When compared to its use in the United States, the bicycle's use in Europe is startling. The streets of European cities are often filled with commuters on bicycles, greatly outnumbering the automobiles on the road. In China, nearly 200 million people (50% of the work force) commute to their jobs on bicycles. Bicycles there replace automobiles in filling up the cities' parking lots.

A field of research that has been conducted for over a century but which has seen little success is that of alternative leg motions for power input. When using a rotary crank mechanism, the leg must apply force in varying directions to complete one revolution of the chain ring. At the top and bottom of the stroke, a purely horizontal force is required to maintain motion of the crank. For about 20 degrees on either side of these "dead" spots (about 80 degrees out of the total 360) the horizontal force required to propel the crank is far greater than the vertical force. It is obvious that one can push down with the leg with a much greater force than one can push forward. Thus, these 80 degrees are being wasted in power transfer to the rear wheel. For certain people, such as those with artificial legs or those with limited motion or flexibility of the knee, a forward motion of the leg can be nearly impossible while a downward motion is relatively easy. Thus a mechanism which would only require linear vertical motion of the pedals would be highly desirable because it would not only be more efficient, it would tailor to a larger market of people. Some studies have shown that there may be biomechanical advantages to using an elliptical pedal motion rather than a circular motion or a linear motion. An elliptical pedal motion can give the advantage of using primarily vertical motion with small amounts of horizontal motion at the top and bottom of the pedal stroke while providing a more natural and comfortable leg motion than a linear pedal motion would. Because some bicyclists may prefer a linear pedal motion and some may prefer an elliptical motion, it would be desirable to provide a pedal mechanism which can be converted to provide either linear or elliptical reciprocating pedal motion.

The common rotary crank mechanism has withstood the test of time as the primary form of power transfer device. Although research has shown that a linear movement of the leg is more efficient, a device has not been created that can match the rotary crank in terms of simplicity and effectiveness for transferring the power. Reports dating back as early as 1968 show that cyclers were very interested in departing from the normal rotary crank systems. However, no manufacturer has been able to satisfy the cycler with a durable, compact, efficient mechanism for an alternate leg motion. Previous attempts at alternative motions have been very complex systems of levers, clutches and gears. A rotary crank, on the other hand is very durable and easy to build and maintain. To date, the rotary crank is still used on every major brand of bicycle in production.

One attempt at an alternate leg motion for propelling a bicycle is described in Klopfenstein U.S. Pat. No. 4,561,668. This bicycle allows the leg to move through a slightly curved motion over a range of about 165 degrees. Tests from the developer show an increase in output torque when compared to a normal rotary crank system. However, the complexity of the system, consisting of several linkages and clutches, has hindered the acceptance of the mechanism.

Another alternate drive mechanism is described in Lenhardt U.S. Pat. No. 4,564,206. This drive uses a complicated 5 bar mechanism to allow the pedals to move in an arcuate path.

Pollard U.S. Pat. No. 4,019,230 describes a mechanism which uses one way clutches to allow for a reciprocating arcuate movement of the pedals.

Trammell U.S. Pat. No. 3,779,099 describes a mechanism which is driven by long lever arms connected to a linkage which is attached to one way clutches. This device allows for movement only in a 180 degree path but is still circular in motion.

SUMMARY OF THE INVENTION

The present invention is an application of a Cardan gear type mechanism which is used to convert linear or elliptical reciprocating motion of a bicycle's pedals to rotary motion of the spindle and therefore the wheels. A Cardan gear mechanism works on the principle that any point on the periphery of a circle rolling inside of another circle describes a hypocycloid. This curve degenerates into a true straight line if the diameters of the circles are in a 2 to 1 ratio. Cardan gear systems usually use an internal gear to define the outer circle. In order to make a simple, cheap mechanism, however it would be advantageous to use only external gears. By using a planetary gear system with a fixed sun gear, a planet gear revolving about the sun gear and a linkage such as an idler gear or a chain drive between the planet gear and the sun gear it is possible to modify a Cardan type gear arrangement to use only external gears. The present invention incorporates just such a simplified Cardan type gear mechanism for the pedals of a bicycle.

The invention consists of a pair sun gears stationarily mounted concentrically with the bicycle's spindle, and a pair of planet gears which revolve around the sun gear. There is a set of linkage arms between the spindle and the planet gear which is fixed to the spindle and rotatably connected to the planet gear. A second pair of linkage arms are secured to the planet gears to rotate along with them. A pair of pedals are mounted on the second linkage arms. As the first linkage arms rotate the planet gears, and therefore the second linkage arms, rotate with respect to the first linkage arms in the opposite direction that the first linkage arms are rotating. This is achieved by connecting the planet gears to the sun gears either through a set of idler gears mounted to the first linkage arms between the planet gears and the sun gears or through a set of chains trained around the planet and sun gears. If the ratio of the diameters of the sun gears and the planet gears is 2 to 1 and if the first linkage arms are of the same length as the second linkage arms, then the pedals will follow a linear reciprocating path while imparting rotary motion to the bicycle's spindle. If the ratio of the sun and planet gears is 2 to 1 but the second linkage arms are either longer or shorter than the first linkage arms then the pedals will follow an elliptical path. If the second linkage arms are shorter than the first linkage arms then the pedals will move in an elliptical path in a forward direction, that is they will travel in the same direction as the spindle. If the second linkage arms are longer than the first linkage arms then the pedals will move in an elliptical path in a backwards direction, that is they will travel in the opposite direction as the spindle. The bicycle's spindle can be connected to the rear wheel through a conventional sprocket and chain system so that the bicycle will be propelled by moving the pedals in a linear or elliptical motion.

It is an objective of the present invention to provide a mechanism which allows a bicycle to be driven with a linear or elliptical reciprocating stroke of the pedals.

It is a further objective of the present invention to provide a mechanism which gives high torque, power and efficiency through almost all of the stroke of the pedals on a bicycle.

It is a further objective of the present invention to provide a mechanism to propel a bicycle with linear or elliptical reciprocating pedal motion which is cheap and simple to produce and which is very rugged and durable.

It is a further objective of the present invention to provide a mechanism to propel a bicycle with linear or elliptical reciprocating pedal motion which can be easily retrofited onto any standard bicycle without having to generally modify the frame or drive train of the bicycle.

The foregoing and other objects and advantages of this invention will be more fully understood from the following detailed description of the invention and from the accompanying drawings.

BRIEF DESCRIPTION OF THE DRAWINGS

FIG. 2 is the drive mechanism of the present invention at 0 degrees.

FIG. 3 is the drive mechanism of the present invention at 45 degrees.

FIG. 4 is the drive mechanism of the present invention at 90 degrees.

FIG. 5 is the drive mechanism of the present invention at 135 degrees.

FIG. 6 is the drive mechanism of the present invention at 180 degrees.

FIG. 7 is a sectional view taken along lines 7—7 of FIG. 1.

FIG. 8, is a second embodiment of the drive mechanism of the present invention which employs a chain rather than an idler gear to connect the planet gear and the sun gear.

DETAILED DESCRIPTION OF THE INVENTION

Figure 1:
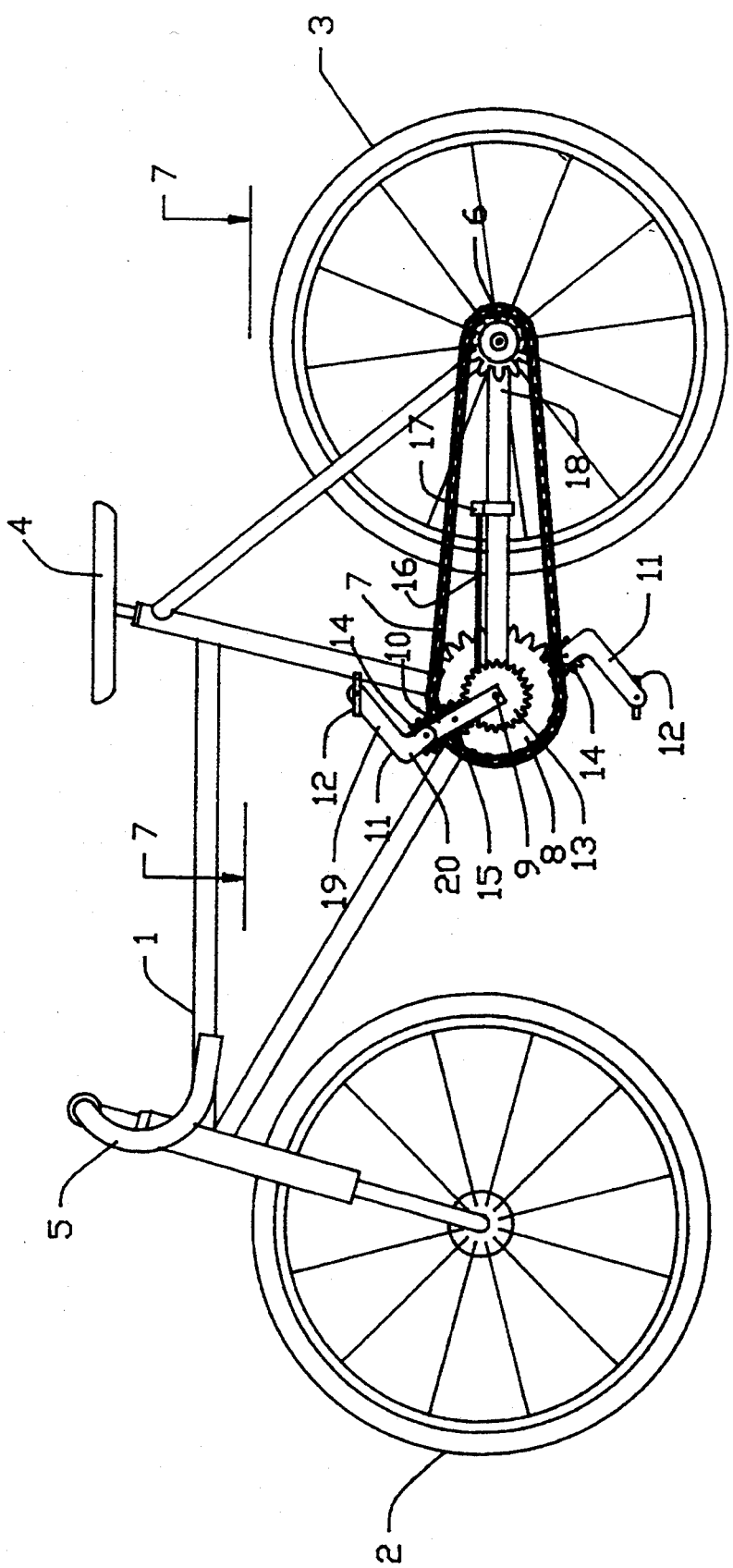
FIG. 1 is a side elevation view of a bicycle incorporating the reciprocating drive of the present invention.

FIG. 1 shows a bicycle 1 with a front wheel 2, a rear wheel 3, a seat 4, and handle bars 5, The rear wheel 3 is driven by a sprocket 6, The rear wheel sprocket 6 is driven by a chain 7 which is trained around rear wheel sprocket 6 and around drive sprocket 8. The present invention lies in the means for imparting motion to drive sprocket 8. Drive sprocket 8 is fixedly attached to a spindle 9 so that spindle 9 and drive sprocket 8 rotate together. Spindle 9 is in turn attached to a pair of first linkage arms 10 so that spindle 9 and first linkage arms 10 rotate together. There are two linkage arms 10 on opposite sides of spindle 9 which are disposed at approximately 180 degrees to each other. A second set of linkage arms 11 are rotatably connected at one end to the first linkage arms 10 and pedals 12 are rotatably connected to the other end of linkage arms 11. The second linkage arms 11 rotate relative to first linkage arms 10 as first linkage arms 10 rotate because of a planetary gear system.

The planetary gear system can be more easily understood with reference to FIGS. 2 through 6. The gear system consists of a sun gear 13 which is mounted to be concentric with spindle 9, a planet gear 14 which is rotatably mounted to the far end of linkage arm 10, and an idler gear 15 rotatably mounted to linkage arm 10 in between sun gear 13 and planet gear 14.

Sun gear 13 is a spur gear in the preferred embodiment and may be bearing mounted to spindle 9 or may be independently supported so that it is not in contact with spindle 9. The main feature of sun gear 13 is that it must be stationary relative to the frame of bicycle 1. Sun gear 13 can be held stationary, for example, by connecting rod 16 as seen in FIG. 1 or FIG. 7. Connecting rod 16 may be attached to sun gear 13 by any suitable method. It may be welded on or attached by means of a threaded connection through a threaded hole in sun gear 13. Connecting rod 16 is held stationary to the bicycle frame with a clamp 17 on rear wheel stays 18.

Planet gear 14 is a spur gear in the preferred embodiment and is bearing mounted to a first linkage arm 10 with a needle bearing or other suitable bearing. It is fixedly attached to the second linkage arm 11 so that planet gear 14 and second linkage arm 11 rotate together.

Idler gear 15 is a spur gear in the preferred embodiment and is bearing mounted to a first linkage arm 10 with a needle bearing or other suitable bearing. Idler gear 15 meshes with sun gear 13 and planet gear 14. The idler gear 15 serves the purpose of reversing the direction of rotation of planet gear 14 as it orbits sun gear 13. Thus as the spindle 9 and the first linkage arms 10 rotate relative to the bicycle 1 and the sun gear 13, the second linkage arms 11 rotate in the opposite direction relative to the first linkage arms 10.

The diameter D1 of the sun gears 13 is exactly twice the diameter D2 of the planet gears 14. In the preferred embodiment of the invention the length L1 of the first linkage arms 10 between the sprocket 9 and the planet gears 14 is the same as the length L2 of the second linkage arms 11 between the planet gears 14 and the pedals 12. If these dimensional requirements are fulfilled then as the first linkage arms 10 rotate through a given angle the second linkage arms 11 will rotate relative to the first linkage arms 10 through an angle that is twice the angle through which the first linkage arms 10 rotate and the path of the pedals 12 will follow a straight line. The diameter of the idler gear 15 is irrelevant since it serves only to change the direction of rotation of planet gear 14. Since any size gear will work just as well for idler gear 15 its size may be selected to provide the proper length L1 of first linkage arm 10. FIGS. 2 through 6 show various positions of the pedals 12 and the drive mechanism through one half of a stroke. It may be clearly seen from these Figures that the pedals 12 follow a straight line. The return half of the stroke of pedals 12 will be identical to the half of the stroke shown in FIGS. 2 through 6 except that the linkage arms 10, 11 will be 180 degrees offset.

As shown, the second linkage arms 11 are composed of a long leg 19 and a short leg 20 with a substantially 90 degree bend between them. By making the second linkage arms 11 this shape there is a gain of torque during the relatively low torque "dead" portions at the top and bottom of the pedal stroke. Alternatively, the second linkage arms 11 may be made as straight links without any bend in them. If the second linkage arms 11 are made as straight links rather than bent links, the torque advantage will be sacrificed but the linkage arms will be simpler and therefore cheaper to manufacture.

A second embodiment of the invention is shown in FIG. 8. In this embodiment of the invention, sun gear 13 and planet gear 14 are sprockets instead of spur gears. Instead of providing an idler gear to change the direction of rotation of planet gear 14 there is a chain 21. Since the idler gear served no purpose other than to reverse the direction of rotation of planet gear 14, a chain 21 will function exactly the same. A chain system as shown in FIG. 8 has the added advantage over a system with idler gears that a chain tensioner can be included in the system so as to take out any slop or play in the pedals.

Figure 10:
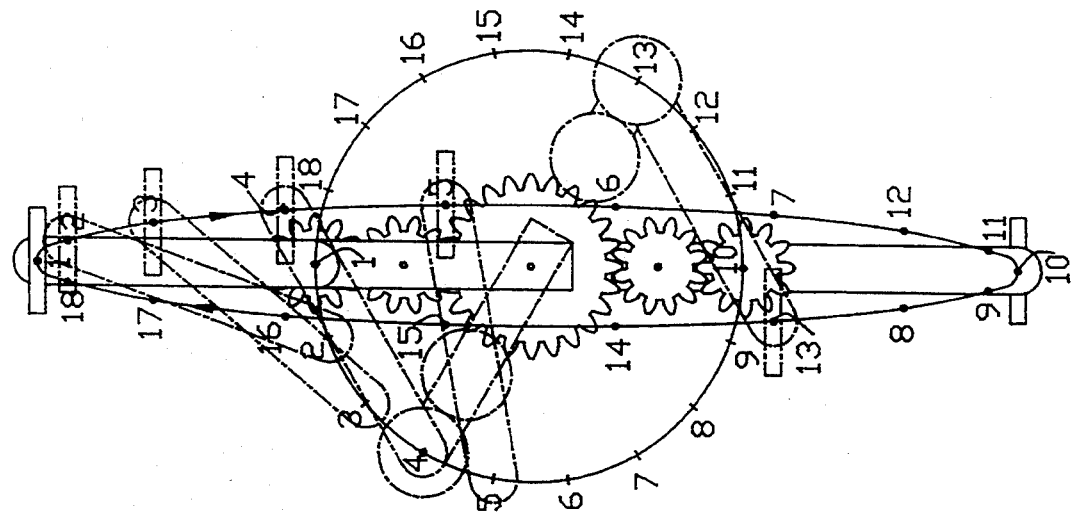
FIG. 10 is another embodiment of the invention in which the pedals travel in a backwards elliptical path.
Figure 9:
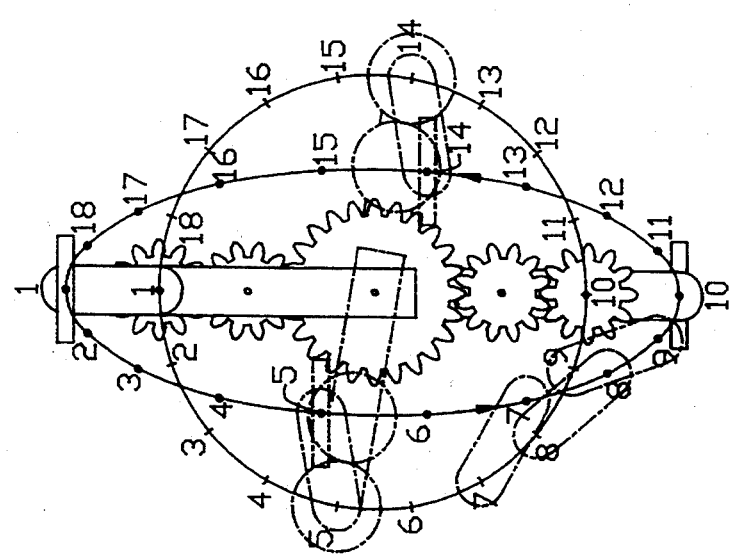
FIG. 9 is another embodiment of the invention in which the pedals travel in a forwards elliptical path.

Two other embodiments of the invention are shown in FIGS. 9 and 10. In these embodiments the second linkage arms 11 are either shorter or longer than the first linkage arms 10 so that the pedals will follow an elliptical rather than a linear path.

FIG. 9 shows the embodiment of the invention in which the second linkage arms 11 are shorter than the first linkage arms 10. In this embodiment the pedals move in an elliptical path in a forwards direction, i.e. the pedals move in the same direction as the spindle. In FIG. 9, the various angular positions of the first and second linkage arms are shown schematically. The paths of the planet gears 14 and the pedals 12 are traced out with several corresponding positions being numbered. It can therefore be seen that the pedals 12 follow an elliptical path in the same direction as the spindle 9. It should be clear from FIG. 9 that the nearer the lengths of the second linkage arms 11 are to the lengths of the first linkage arms 10 the closer the path of the pedals 12 is to a straight line. As the lengths of the second linkage arms 11 are shortened the pedals 12 follow a wider elliptical path. If the lengths of second linkage arms 11 are chosen as zero then the pedals will follow a circular path and the mechanism becomes a conventional rotary crank system. Therefore the length of the second linkage arms 11 can be selected to provide an elliptical path of pedals 12 that gives the best biomechanical advantage to the bicycle rider.

FIG. 10 shows the embodiment of the invention in which the second linkage arms 11 are longer than the first linkage arms 10. In this embodiment the pedals move in an elliptical path in a backwards direction, i.e. the pedals move in the opposite direction as the spindle. In FIG. 10, the various angular positions of the first and second linkage arms are shown schematically. The paths of the planet gears 14 and the pedals 12 are traced out with several corresponding positions being numbered. It can therefore be seen that the pedals 12 follow an elliptical path in the opposite direction as the spindle 9. The advantage of having the pedals 12 move in an elliptical path in a backwards direction is that as a pedal is pushed downwards to give propulsion to the bicycle, the pedal will be further towards the rear of the bicycle. That means that the bicycle rider's leg will be angled further back as he is pushing the pedal down. There is a biomechanical advantage for the rider to push down on the pedal with his leg angled somewhat backwards because he is able to use his weight to better advantage and also because he is able to more efficiently use the powerful hamstring muscles in the back of the leg. It should be clear from FIG. 10 that the nearer the lengths of the second linkage arms 11 are to the lengths of the first linkage arms 10 the closer the path of the pedals 12 is to a straight line. As the lengths of the second linkage arms 11 are lengthened the pedals 12 follow a wider elliptical path. Therefore the length of the second linkage arms 11 can be selected to provide an elliptical path of pedals 12 that gives the best biomechanical advantage to the bicycle rider.

An advantage of the present invention is that it can be easily retrofited onto any standard bicycle. The spindle 9 can be any standard bicycle spindle or can be a specially made spindle which is manufactured to fit into a standard bicycle hub. The first linkage arms 10 can be machined to fit onto the ends of the spindle 9 in exactly the same manner that the cranks would fit in a normal rotary crank system. The sun gears 13 can fit onto the spindle 9 with bearings and the connecting rods 16 for the sun gears can be secured to the frame with clamps 17. In this manner no cutting, machining, welding or other modifications of the bicycle frame need to be performed. Therefore all of the parts of the present invention may be supplied in kit form and anyone can easily change this system for their conventional rotary crank system using only ordinary tools.

Further, because there are relatively few moving parts and no ratchets or clutches, the mechanism of the present invention will be very rugged and reliable with little or no maintenance necessary. Also, all of the parts of the present invention can be easily mass produced using standard methods. The components of the mechanism can be made of any material with a fairly high strength to weight ratio such as aluminum or carbon steel. Therefore, the mechanism should be relatively inexpensive to produce.

While preferred embodiments of the invention have been shown and described, it will be apparent to those skilled in the art that various modifications may be made in these embodiments without departing from the scope of the invention. Therefore, it is intended that the invention not be limited to the particular embodiments disclosed but that the scope of the invention be defined by the following claims.

We claim:

1. A drive mechanism for providing propulsion to a spindle comprising:
    a pair of stationary sun gear means mounted about said spindle;

a pair of first arms each fixedly attached to said spindle for rotation therewith in a first predetermined direction;

a pair of planet gear means each rotatably mounted to a respective one of said first arms and drivingly connected to a respective one of said sun gear means to rotate in a second predetermined direction which is opposite the first predetermined direction in which said pair of first arms rotate;

a pair of second arms each fixedly attached to a respective one of said planet gear means for rotation therewith in said second predetermined direction; and a pair of pedals each rotatably connected to a respective one of said second arms, whereby motion of said pedals imparts rotary motion to said spindle.

2. The drive mechanism of claim 1 wherein said pair of sun gear means and said pair of planet gear means are spur gears.

3. The drive mechanism of claim 2 wherein said planet gear means are drivingly connected to said sun gear means by way of a pair of idler spur gears each rotatably connected to a respective one of said first arms so that it is in driving contact with a respective one of said sun gear means and a respective one of said planet gear means.

4. The drive mechanism of claim 1 wherein said sun gear means and said planet gear means are sprockets.

5. The drive mechanism of claim 4 wherein said planet gear means are drivingly connected to said sun gear means by way of a pair of chains each extending about and connecting a respective one of said sun gear means and a respective one of said planet gear means.

6. The drive mechanism of claim 1 wherein the ratio of the diameter of said sun gear means to the diameter of said planet gear means is substantially 2 to 1.

7. The drive mechanism of claim 1 wherein the distance along said first arms between the center of said spindle and the center of said planet gear means is substantially the same as the distance along said second arms between the center of said planet gear means and the center of said pedals.

8. The drive mechanism of claim 6 wherein the distance along said first arms between the center of said spindle and the center of said planet gear means is substantially the same as the distance along said second arms between the center of said planet gear means and the center of said pedals.

9. The drive mechanism of claim 1 wherein the distance along said first arms between the center of said spindle and the center of said planet gear means is longer than the distance along said second arms between the center of said planet gear means and the center of said pedals.

10. The drive mechanism of claim 6 wherein the distance along said first arms between the center of said spindle and the center of said planet gear means is longer than the distance along said second arms between the center of said planet gear means and the center of said pedals.

11. The drive mechanism of claim 1 wherein the distance along said first arms between the center of said spindle and the center of said planet gear means is shorter than the distance along said second arms between the center of said planet gear means and the center of said pedals.

12. The drive mechanism of claim 6 wherein the distance along said first arms between the center of said spindle and the center of said planet gear means is shorter than the distance along said second arms between the center of said planet gear means and the center of said pedals.

13. The drive mechanism of claim 1 wherein said second arms each comprise a substantially straight link.

14. The drive mechanism of claim 1 wherein said second arms each comprise a first leg and a second leg at a predetermined angle to said first leg.

15. The drive mechanism of claim 14 wherein said predetermined angle is substantially 90 degrees.

16. A drive mechanism on a bicycle comprising a spindle rotatably connected to said bicycle, a pair of pedals, sun gear means drivingly connected to said spindle, planet gear means drivingly connected to said pair of pedals and to said gun gear means so that said pair of pedals are drivingly connected to said spindle whereby one of either linear or elliptical reciprocating movement of said pedals drives planet gear means so that said planet gear means drive said sun gear means and said sun gear means impart rotary movement to said spindle, further comprising a rear wheel on said bicycle with a first sprocket fixedly attached to said rear wheel for rotation therewith, a second sprocket fixedly attached to said spindle for rotation therewith, and a chain extending about and connecting said first sprocket and said second sprocket so that said one of either linear or elliptical reciprocating movement of said pedals imparts rotary movement to said rear wheel.

17. The drive mechanism of claim 16 wherein said linear or elliptical reciprocating movement of said pedals is linear reciprocating movement of said pedals.

18. The drive mechanism of claim 16 wherein said linear or elliptical reciprocating movement of said pedals is elliptical reciprocating movement of said pedals.

19. The drive mechanism of claim 18 wherein said elliptical reciprocating movement of said pedals is in the same direction as said rotary movement of said spindle.

20. The drive mechanism of claim 18 wherein said elliptical reciprocating movement of said pedals is in the opposite direction as said rotary movement of said spindle.

21. The drive mechanism of claim 16 further comprising a pair of first arms fixedly attached to said spindle for rotation therewith and a pair of second arms each rotatably connected to a respective one of said first arms, each of said pedals being rotatably connected to a respective one of said second arms.

22. The drive mechanism of claim 21 further comprising a pair of sun gear means stationarily mounted about said spindle and a pair of planet gear means each fixedly attached to a respective one of said second arms for rotation therewith and drivingly connected to a respective one of said sun gear means.

23. The drive mechanism of claim 22 wherein said pair of sun gear means and said pair of planet gear means are spur gears and said planet gear means are drivingly connected to said sun gear means by way of a pair of idler spur gears each rotatably connected to a respective one of said first arms so that it is in driving contact with a respective one of said sun gear means and a respective one of said planet gear means.

24. The drive mechanism of claim 22 wherein said sun gear means and said planet gear means are sprockets and said planet gear means are drivingly connected to said sun gear means by way of a pair of chains each extending about and connecting a respective one of said sun gear means and a respective one of said planet gear means.

25. The drive mechanism of claim 21 wherein said second arms each comprise a first leg and a second leg at a predetermined angle to said first leg.

26. The drive mechanism of claim 25 wherein said predetermined angle is substantially 90 degrees.

27. A method of propelling a bicycle comprising the steps of:
providing a bicycle with a spindle rotatably connected thereto;
providing a pair of sun gears stationarily mounted about said spindle;
providing a pair of first arms fixedly attached to said spindle for rotation therewith;
providing a pair of second arms each rotatably connected to a respective one of said first arms and a pair of planet gears each fixedly attached to a respective one of said second arms for rotation therewith, each of said planet gears being drivingly connected to a respective one of said sun gears;
providing a pair of pedals each rotatably connected to a respective one of said second arms; and
moving said pedals in one of either a linear or elliptical reciprocating movement so as to impart rotary movement to said spindle and to said pair of first arms in a first predetermined direction and to drive said planet gears about said sun gears so as to impart rotary movement to said pair of second arms in a second predetermined direction which is opposite said first predetermined direction.

28. The method of claim 27 wherein the step of moving said pedals in a linear or elliptical reciprocating movement comprises moving said pedals in a linear reciprocating movement.

29. The method of claim 27 wherein the step of moving said pedals in a linear or elliptical reciprocating movement comprises moving said pedals in an elliptical reciprocating movement.

30. The method of claim 29 wherein the step of moving said pedals in an elliptical reciprocating movement comprises moving said pedals in an elliptical reciprocating movement in the same direction as said rotary movement of said spindle.

31. The method of claim 25 wherein the step of moving said pedals in an elliptical reciprocating movement comprises moving said pedals in an elliptical reciprocating movement in the opposite direction as said rotary movement of said spindle.

32. The method of claim 27 further comprising the steps of providing a rear wheel rotatably connected to said bicycle, and drivingly connecting said rear wheel to said spindle, so that said step of moving said pedals in a linear or elliptical reciprocating motion imparts rotary movement to said rear wheel.

* * * * *